Sept. 16, 1958 D. BAKER ET AL 2,852,612

MULTISTATION TELEPHONE INTERCOMMUNICATING AND CONFERENCE SYSTEM

Filed Dec. 21, 1955 5 Sheets-Sheet 1

INVENTORS D. BAKER
H. T. CARTER
S. A. KELNHOFER
BY A. F. Kane
ATTORNEY

Sept. 16, 1958 D. BAKER ET AL 2,852,612

MULTISTATION TELEPHONE INTERCOMMUNICATING
AND CONFERENCE SYSTEM

Filed Dec. 21, 1955 5 Sheets-Sheet 2

INVENTORS D. BAKER
H. T. CARTER
S. A. KELNHOFER

BY A. F. Kane

ATTORNEY

INVENTORS D. BAKER
H. T. CARTER
S. A. KELNHOFER
BY A. F. Kane
ATTORNEY

INVENTORS D. BAKER
H. T. CARTER
S. A KELNHOFER
BY A. F. Kane
ATTORNEY

Sept. 16, 1958 D. BAKER ET AL 2,852,612

MULTISTATION TELEPHONE INTERCOMMUNICATING AND CONFERENCE SYSTEM

Filed Dec. 21, 1955 5 Sheets-Sheet 5

INVENTORS D. BAKER
H. T. CARTER
S. A. KELNHOFER

BY A. F. Kane

ATTORNEY

United States Patent Office 2,852,612
Patented Sept. 16, 1958

2,852,612

MULTISTATION TELEPHONE INTERCOMMUNICATING AND CONFERENCE SYSTEM

Donn Baker, Irvington, Herman T. Carter, Madison, and Sylvester A. Kelnhofer, Morristown, N. J., assignors to Bell Telephone Laboratories, Incorporated, New York, N. Y., a corporation of New York Application December 21, 1955, Serial No. 554,431

7 Claims. (Cl. 179—18)

Figure 1:
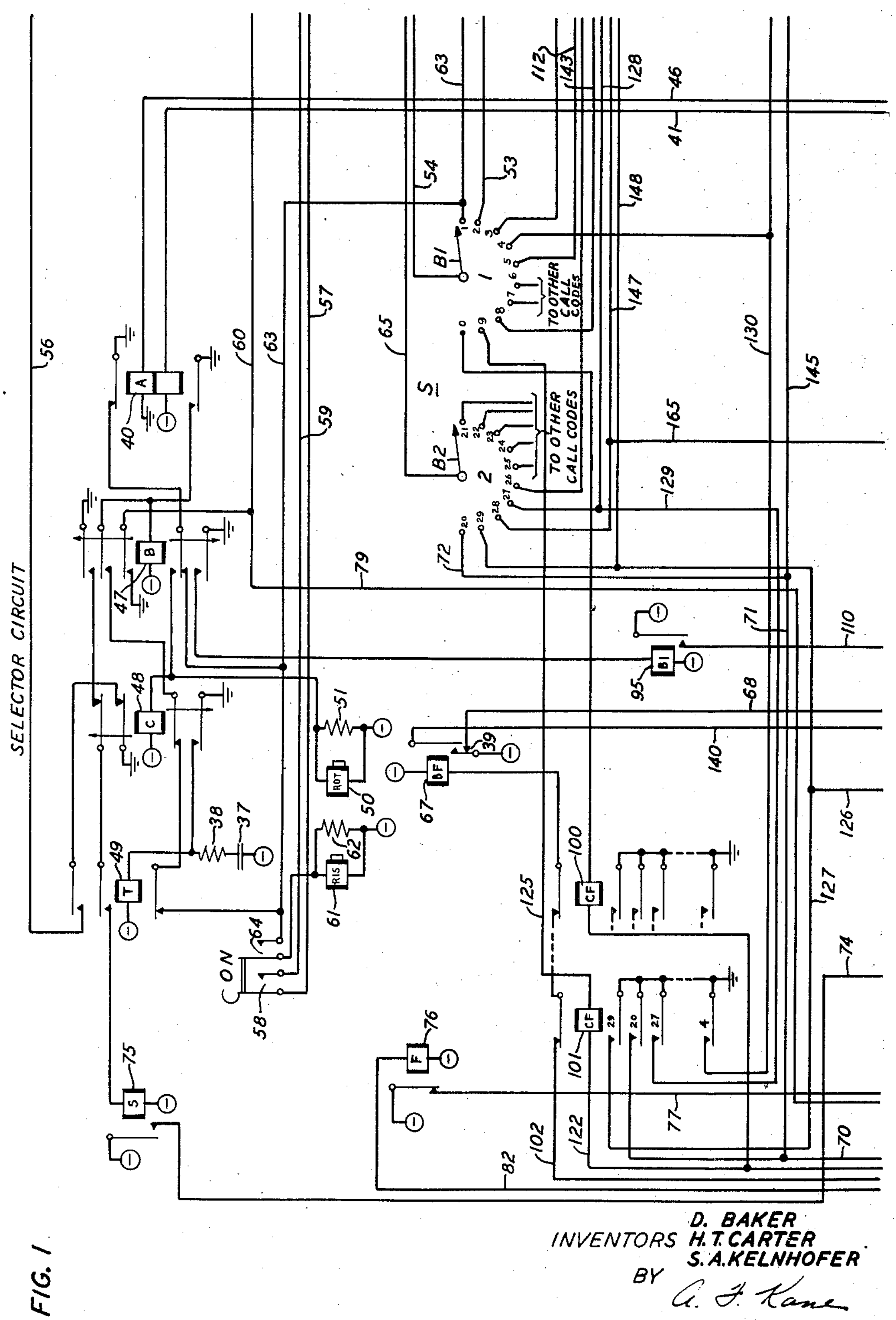
Figure 2:
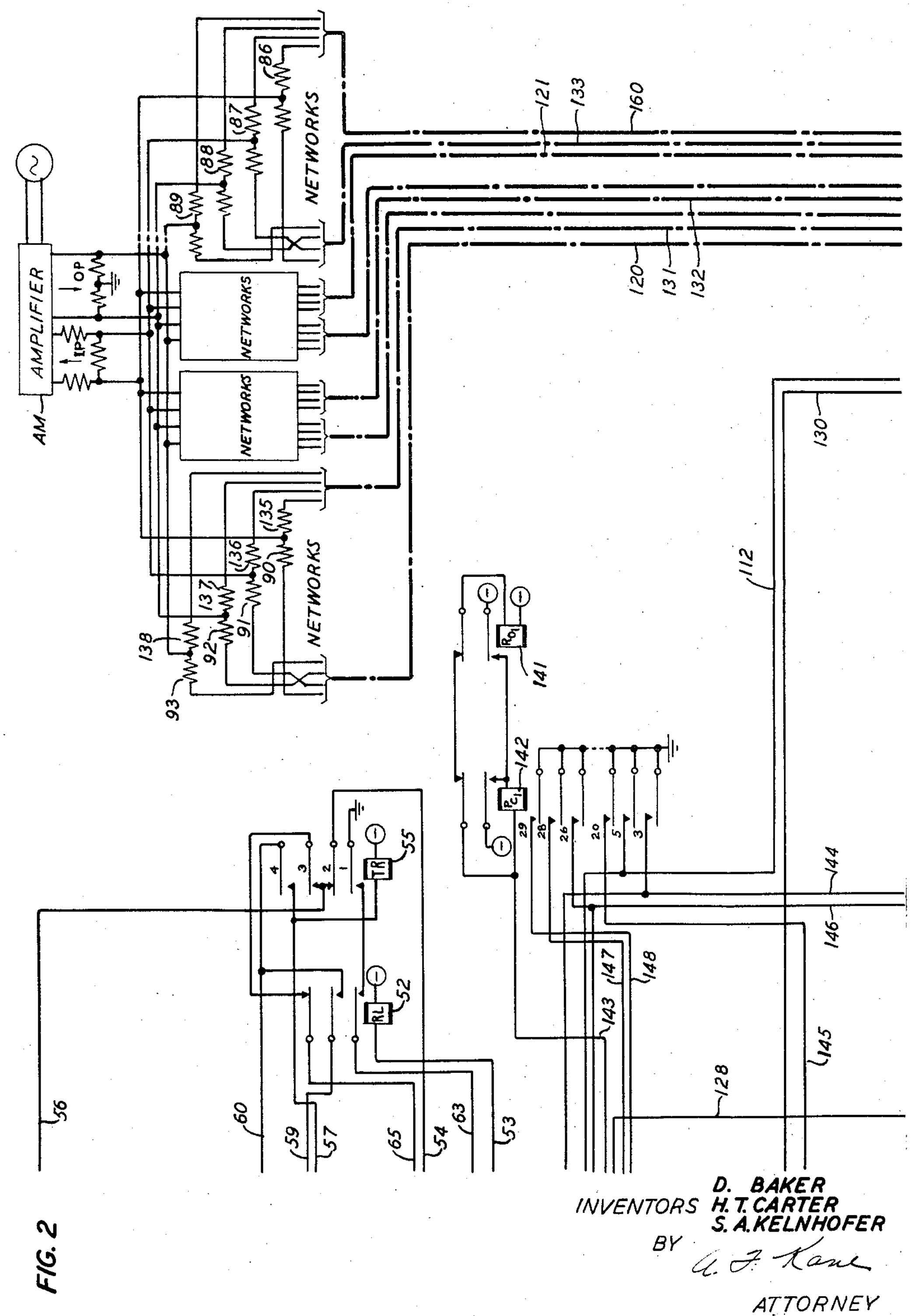

This invention relates to intercommunicating telephone systems and particularly to dial selective intercommunicating systems involving a plurality of principal and subordinate stations.

It is the object of this invention to provide a simplified and otherwise improved multistation intercommunicating telephone system of the type in which signaling between stations is accomplished on an automatic selective basis by means of a dial-controlled selector switch.

Systems of the character briefly outline above and as shown, for example, in G. H. Duhnkrack Patent 2,530,-943 of November 21, 1950, generally comprise a plurality of telephone stations all but one of which are subordinate stations selectively accessible to a single principal station and devoid of any call-originating facilities in so far as communication with other stations of the system is concerned. In accordance with a feature of this invention, facilities are provided for enabling any principal station to be selectively signaled from any subordinate station as well as from any other principal station, and any station, whether principal or subordinate, to be selectively signaled from any principal station.

Another feature of the invention involves facilities and circuitry which preclude the possibility of station-to-station selective signaling between subordinate stations while permitting certain designated subordinate stations to signal other subordinate and principal stations on a group basis for conference purposes.

A further feature of the invention contemplates preset conference plans whereby groups of stations may be simultaneously signaled from any of certain designated calling stations by the performance of a single dialing operation at the calling station.

A still further feature of the invention contemplates preset conference plans of different capacities whereby station groups of different magnitudes may be selectively signaled in response to the dialing of a single digit at certain designated calling stations.

In accordance with another feature of the invention all selective signaling functions initiated at a calling station result from the operation of a dial at the calling station in accordance with a one- or a two-digit code.

In accordance with still another feature of the invention, an audible call signal is operated at the termination of any dialing operation and is automatically silenced at the end of a predetermined interval of time.

A further feature resides in the use of a single visual signal at each station of the system which is distinctively operated to indicate (1) a line-busy condition, (2) an incoming call, and (3) the response of an attendant at a called station.

A still further feature of the invention resides in the use of a four-wire speech transmission path between stations and impedance matching networks which provide essentially independent connections of the stations to a common amplifier and prevent the speech-receiving circuits from being overloaded.

Another feature of the invention contemplates an intercommunicating system in which a dial-controlled selector switch is employed solely for selective signaling purposes and in which means other than the selector switch serve to control the completion of the speech transmission paths between stations.

Figures 5, 6:
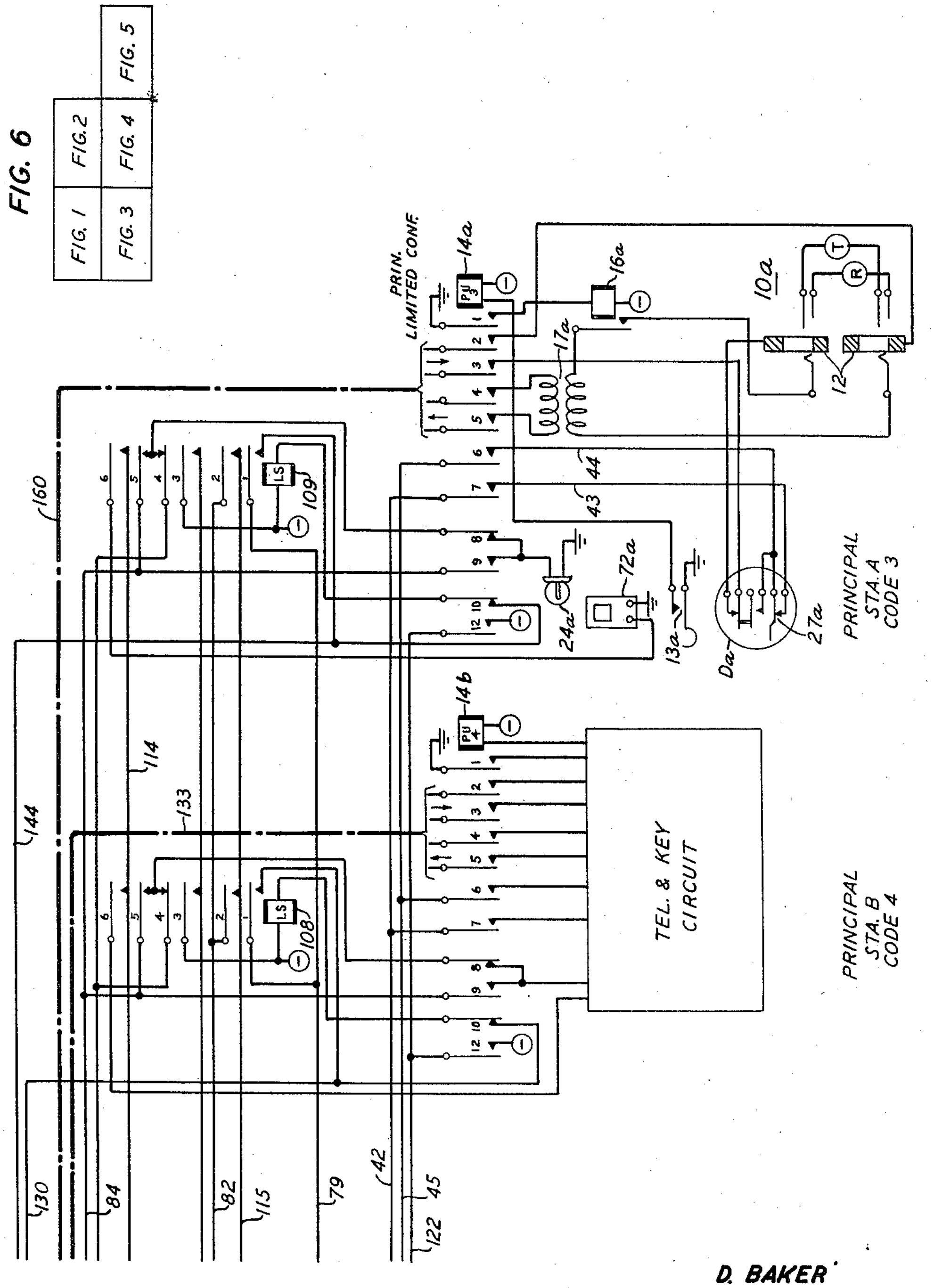

These and other features of the invention will be readily understood from the following detail description when read with reference to the accompanying drawings Figs. 1, 2, 3, 4 and 5 of which, when arranged in accordance with the plan shown in Fig. 6, constitute a circuit diagram of an intercommunicating telephone system involving the features of the invention.

Figure 3:
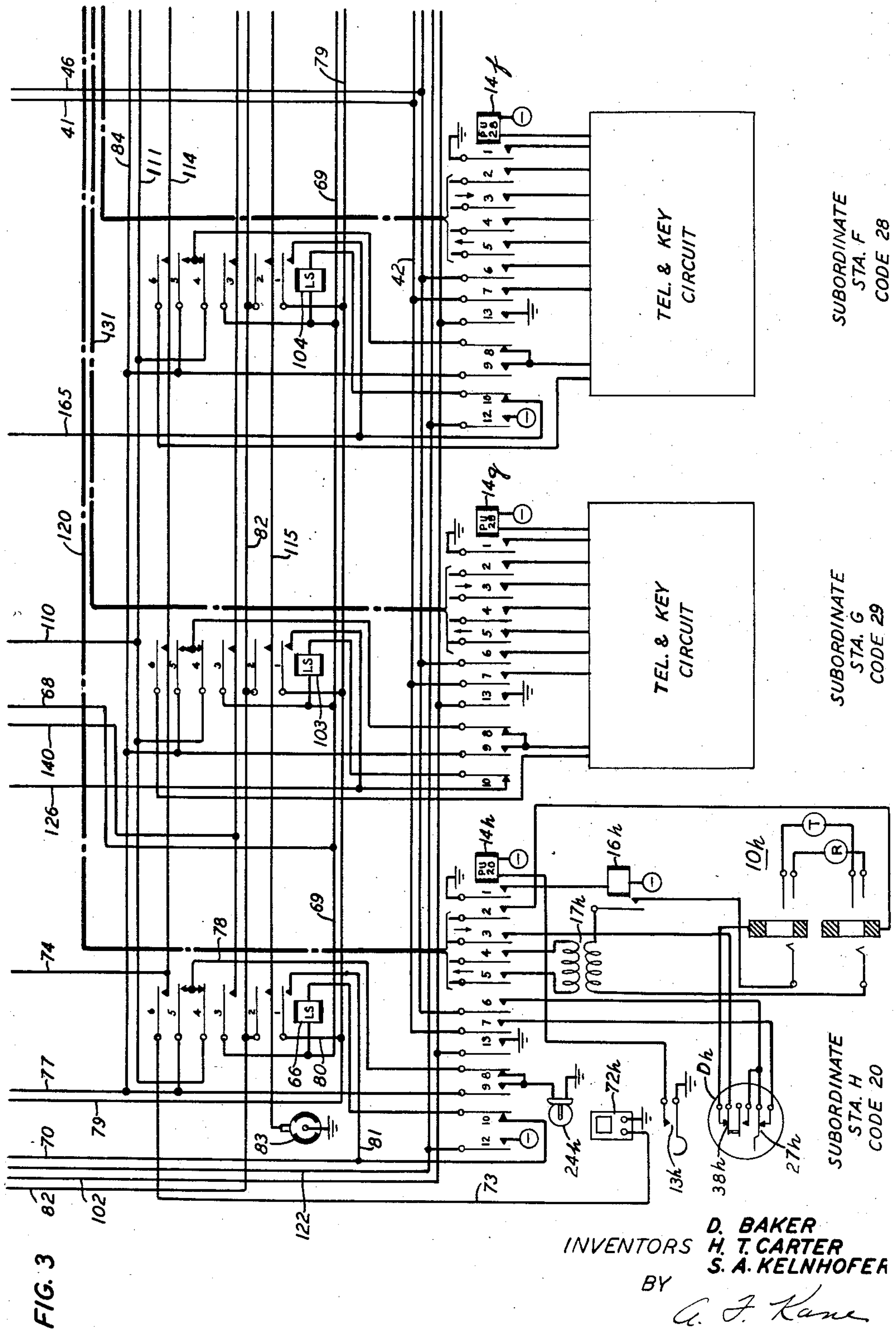
Figure 4:
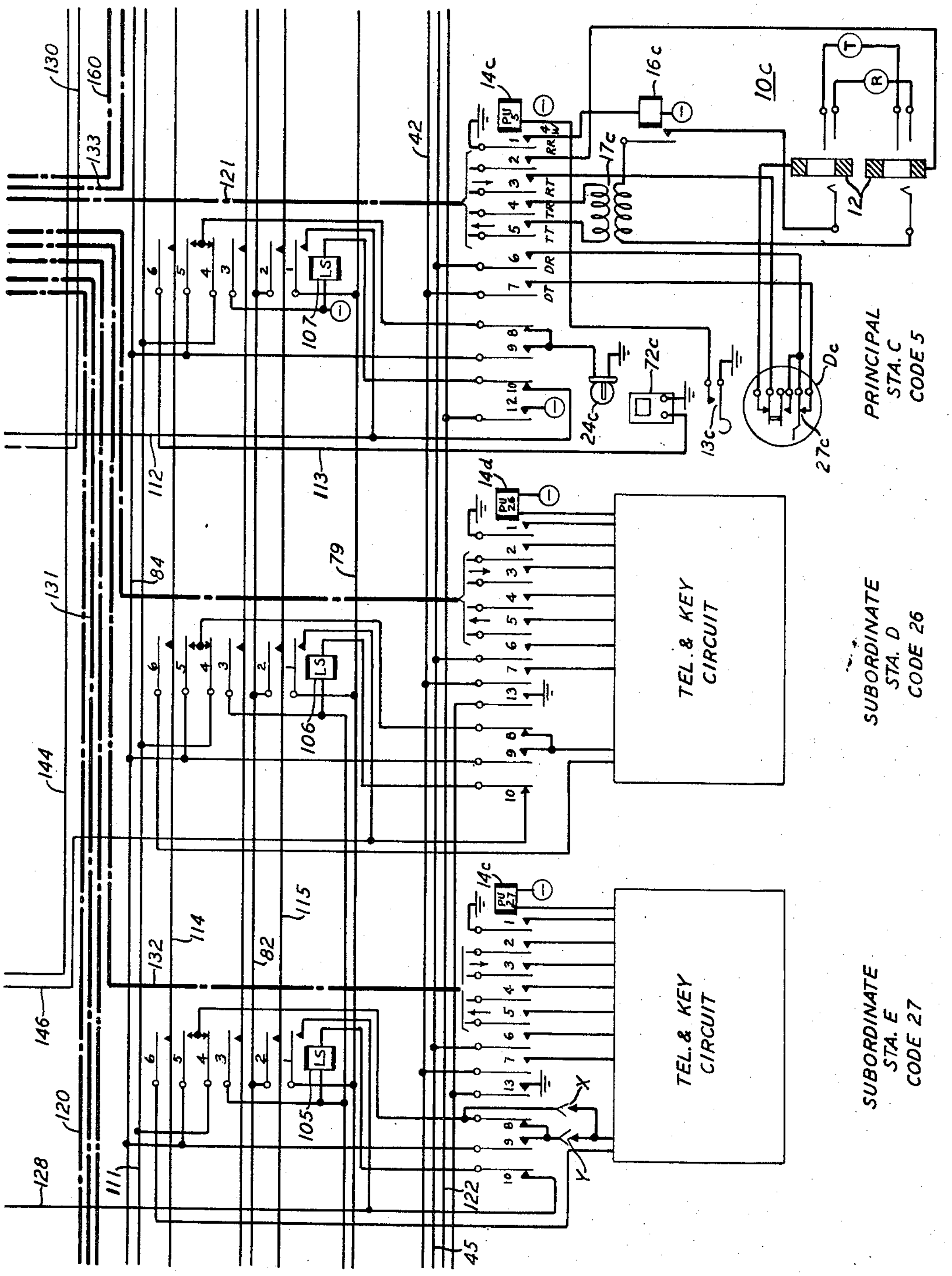

In the exemplary embodiment of the intercommunicating system of this invention shown in the drawings, eight stations, A, B, C, D, E, F, G and H, are indicated at the bottom of Figs. 3, 4 and 5, the apparatus or telephone and key circuits at stations A, C and H being shown in substantial detail, and that of the remaining stations being indicated in block form. It is to be understood that the system of this invention has a capacity of 18 stations which are served by the two terminal banks of a single selector switch S, it being apparent, as will be described in greater detail hereinafter, that certain of the switch terminals, such as terminals Nos. 1 and 2 of terminal bank No. 1, are used either in the control of the switch or in determining which of the two terminal banks is to be employed in setting up a particular signal circuit. In the illustrated embodiment, the switch terminals Nos. 8, 9 and 0 of terminal bank No. 1 are used for conference calls so that, as illustrated, the system will accommodate 15 individual stations, each such station having allocated thereto a particular terminal of the terminal banks Nos. 1 and 2 of switch S. More particularly, switch terminal No. 3 is allocated to station A; switch terminal No. 4 to station B; switch terminal No. 5 to station C; switch terminal No. 26 to station D; switch terminal No. 27 to station E; switch terminal No. 28 to station F; switch terminal No. 29 to station G; and switch terminal No. 20 to station H. Switch terminals 8, 9 and 0, as already indicated, are used to set up conference connections and the remaining switch terminals Nos. 6, 7, 21, 22, 23, 24 and 25 would be, in practice, allocated to seven other stations not illustrated or otherwise indicated in the drawings.

A station may be a principal station or a subordinate station depending upon the facilities located at the station for setting up signal circuits to other stations. In the illustrated embodiment, stations A, B and C are principal stations from which a signal circuit to any other station of the system may be selectively controlled, whereas stations D, E, F, G and H are subordinate stations from which signal circuits to principal stations only may be controlled on a station-to-station basis. However, certain designated principal and subordinate stations, such as stations A, B, C, F and H are provided with facilities whereby the apparatus thereat may be employed to selectively signal predetermined groups of other stations for conference purpose, which groups may include subordinate stations as well as principal stations.

Each station is equipped with a telephone and key circuit which includes a conventional dial for use in selectively controlling the common selector switch S in a manner such that the dialing of either a one- or a two-digit code at any station is all that is required to effectuate the signaling of any other of the stations of the system. Thus, stations served by terminal bank No. 1 of switch S are signaled in response to the dialing of a single digit code whereas those stations served by bank No. 2 are signaled by the dialing of a two-digit code.

The dialing of any code at a calling station is preceded by the actuation of a so-called pickup key which operates a corresponding pickup relay which, among other functions, connects the station telephone circuits to a common amplifier by way of impedance matching networks in a four-wire system. The speech transmitting and receiving equipment at each station is shown at 10*a*, for example, as plug-ended transmitter and receiver elements commonly used by telephone operators or attendants. Connection of such instrumentalities is made at the station by means of jacks as illustrated. It is to be understood that the speech circuits at each station may be terminated in a conventional form of subscriber telephone set rather than in the equipment illustrated.

The operation of the dial selective intercommunicating system of this invention will now be described in detail. For purposes of clarity the description will be made under several separate captions depending upon the nature of the call to be initiated and the character of the calling and called stations.

*Dialing a station-to-station call from a principal station*

In the following description which is addressed to the dialing of a call at a principal station intended for a subordinate station, the station A is selected as the calling principal station and the station H as the called subordinate station. To originate this station-to-station call the attendant at station A actuates key 13*a* and thereafter operates the dial D*a* in accordance with the calling code assigned to station H, which code is chosen to be 2—0. The actuation of key 13*a* completes an obvious energizing circuit for pickup relay 14*a* which thereupon operates. At its No. 1 armature and front contact, relay 14*a* completes an obvious operating circuit for relay 16*a* which relay, at its armature and front contact, closes the speech transmission circuit at station A through to the transmitter T. It is assumed that the attendant's telephone set 10*a*, which includes the transmitter T and receiver R and the associated plugs, is connected to the telephone and key circuit station A by way of the jacks 12.

At its Nos. 2, 3, 4 and 5 armatures and front contacts, relay 14*a* connects the four-wire speech circuit of station A to network resistors 86, 87, 88 and 89 by way of four leads represented by the broken line conductor 160 from whence the connection is extended to amplifier AM by way of the amplifier input IP and the amplifier output OP.

At its Nos. 6 and 7 armatures and front contacts, relay 14*a* connects the pulsing contacts 27*a* of the dial D*a* to the windings of relay 40 in the selector circuit by way of conductors 42 and 41 and conductors 45 and 46. Relay 40 accordingly operates and prepares the selector circuit for the reception of pulses transmitted by the dial D*a*. Suffice it to say at this time that relays 47 and 95 operate over obvious circuits under control of relay 40.

At its No. 8 armature relay 14*a* opens the circuit from Nos. 4 and 5 armature contacts of relay 109 to the lamp signal 24*a* and at its No. 9 armature it completes an energizing circuit for this lamp which includes negative battery, the armature and back contact of relay 76, conductors 77 and 84, the No. 9 armature and front contact of relay 14*a*, the filament of lamp 24*a* and ground. The lamp 24*a* at the calling station A is lighted steadily in this circuit.

At its No. 10 armature, relay 14*a* opens the operating circuit to LS relay 109 to prevent the operation of this relay at this time and at its No. 12 armature, it connects negative battery to conductor 122, which in the instant description serves no useful purpose.

With relay 95 operated under control of relay 47 in the selector circuit, all other lamp signals of the entire system, such as illustrated lamp 24*h* and 24*c*, are lighted steadily in circuits which include, in common, negative battery, the armature and front contact of relay 95, and conductors 110 and 111 and thence, separately, the No. 4 armature and back contact of the corresponding LS relays 66, 103, 104, 105, 106, 107 or 108 and the No. 8 armature and back contact of the corresponding pickup relays 14*h*, 14*g*, 14*f*, 14*e*, 14*d*, 14*c* or 14*b*, their own filaments and ground. Thus, immediately upon the initiation of a call at a station, such as station A, the lamp signals at all stations of the system are lighted steadily to indicate to the attendants thereat that the intercommunicating system is in use.

The dial D*a*, when actuated in accordance with the first digit 2 of the calling code of station H, causes the operating circuit to relay 40 in the selector circuit to be opened and reclosed in unison with the makes and breaks of the pulsing contacts 27*a*. Relay 40 accordingly releases and reoperates twice. Relay 47 being slow-releasing holds operated during dialing. Relay 40, releasing and reoperating, operates and releases rotary magnet 50 which causes the selector S to step in a rotary direction to the selector bank terminal corresponding to the dialed code 2. The control circuit for rotary magnet includes negative battery, winding of magnet 50 and parallel-connected resistor 51, front contact and inner lower armature of relay 47, back contact and upper armature of relay 40 and ground.

On the first release of relay 40, relay 48 operates in an obvious circuit and remains operated during pulsing. In this connection it is recalled that relay 47 remains operated during pulsing. Relay 48, operated, operates relay 49 in an obvious circuit and charges capacitor 37 through resistor 38. At the completion of dialing, relay 40 reoperates and remains operated for the duration of the call. In the instant case, relay 40 reoperates at the end of dialing the first digit of the call number and relay 48 releases. Should relay 47 operate at this time no useful purpose would be served as the lead 77 which extends from the contact of this relay is open-circuited at the No. 5 armatures of the several LS relays.

Incident to the setting of brush B1 of selector switch S on the No. 2 terminal, relay 52 operates in a circuit which includes negative battery, the winding of relay 52, conductor 53, No. 2 terminal of switch S and the associated brush B1, conductor 54, No. 2 armature and back contact of relay 55, conductor 56, front contact and outer upper armature of relay 49, back contact and inner upper armature of relay 48 and ground. Relay 55 now operates in a circuit which includes negative battery, the winding of relay 55, conductor 57, contacts 58 of off-normal switch ON, conductor 59, middle armature and front contact of relay 52, conductor 60, innermost upper armature and front contact of relay 47 and ground. With relay 55 operated, the selector release magnet 61 is operated in a circuit which includes negative battery, the winding of magnet 61 and parallel-connected resistor 62, contacts 64 of off-normal switch ON, conductor 63, innermost armature and front contact of relay 52, front contact and No. 1 armature of relay 55 and ground. The release magnet 61 functions in well known manner to restore selector S to normal position whereupon relay 52 releases. Relay 55, operated, also transfers the operating path of the LS relays from the brush B1 to the brush B2 of selector S thereby preparing the LS relays of those stations, the tens digit of whose calling code is 2, for operation.

The attendant at station A in dialing the second digit 0 causes selector S to reoperate, in a manner now apparent, and advance brush B2 to position No. 20. At the culmination of this dialing operation ground is applied to conductor 72 to effect the operation of LS relay 66 associated with the called station H. The operating circuit for relay 66 includes negative battery, continuity contacts 39 of relay 67, conductor 68, conductor 69, winding of LS relay 66, No. 10 armature and back contact of relay 14*h*, conductors 70, 71 and 72, No. 20 terminal of switch S, brush B2, conductor 65, outermost armature and back contact of relay 52, No. 3 armature and front contact of relay 55, conductor 56, front contact and outer upper armature of relay 49, back contact and inner upper armature of relay 48 and ground.

As previously indicated, relay 49 holds operated for a short time interval on discharge current from capacitor 37 following the release of relay 48 at the end of the dialing operation. Relay 75 accordingly is operated during this interval in a circuit which includes negative battery, the winding of relay 75, front contact and inner upper armature of relay 49, outer upper armature and back contact of relay 48, front contact and outermost upper armature of relay 47. It will be understood that relay 40 reoperates at the conclusion of dialing due to the reclosure of dial contacts 27*a* and thus insures the continued operation of relay 47. With relay 75 operated, the buzzer or audible signal 72*h* at called station H is operated in a circuit which includes ground, the winding of signal 72*h*, conductor 73, No. 6 armature and front contact of LS relay 66, conductor 74, front contact and armature of relay 75 and negative battery. The buzzer 72*h* functions as an audible call signal. While the buzzer 72*h* is illustrated as being individual to station H and all other stations of the system are shown provided with its own separate audible signal, it is apparent that a buzzer, such as 72*h*, might function as a position signal and thus serve a plurality of stations rather than just one station. Just so long as the corresponding LS relay at station H remains operated and relay 49 remains operated on the discharge current from capacitor 37, the buzzer 72*h* will be energized and when relay 49 or the LS relay association with station H releases, the audible signal is silenced. When LS relay 66 operated it locked in a circuit which includes negative battery, the continuity contacts 39 of relay 67, conductors 68 and 69, winding of relay 66, No. 10 armature and back tact of relay 14*h*, conductor 81, front contact and No. 1 armature of relay 66, conductors 80 and 79, innermost armature and front contact of relay 47 in the selector circuit.

Since the LS relay 66 is now operated and locked independent of selector switch S, the switch may be restored to normal and does so when relay 49 eventually releases. When this occurs, release magnet 61 operates in a circuit which includes negative battery, the winding of magnet 61 and parallel-connected resistor 62, contacts 64 of offnormal switch ON, back contact and lower armature of relay 49, back contact and inner lower armature of relay 48, front contact and middle upper armature of relay 47, front contact and lower armature of relay 40 and ground. Switch S responds to the operation of release magnet 61 in well known manner and restores to normal condition.

When LS relay 66 operated, as described, the nature of the visual signals at the calling and called stations is changed and now assumes a flashing character. At its No. 2 armature and front contact LS relay 66 connects interrupter 83 to the winding of relay 76 by way of conductor 82 causing this relay to operate in unison with the circuit interruptions effected by the interrupter. Negative battery thus is intermittently applied to conductor 77 and thence, in parallel circuits, one including the No. 5 armature and front contact of LS relay 66, conductor 78, No. 8 armature and back contact of relay 14*h*, the filament of lamp 24*h* and ground, and the other including conductor 84, No. 9 armature and front contact of relay 14*a*, filament of lamp 24*a* and ground. The lamps at calling station A and called station H flash accordingly, under control of interrupter 83, the latter lamp functioning as a call-indicating signal. It is to be understood that the interrupter 83 is utilized in the immediate descripton and in the drawings for purposes of simplification. In practice, some form of relay-type flashing circuit might well be substituted for the illustrated interrupter. It will be noted that the lamp signals at all other stations of the system continue to be lighted steadily from negative battery at the armature and front contact of relay 95 by way of conductors 110 and 111, the No. 4 armatures and back contacts of the corresponding LS relays and the No. 8 armatures and back contacts of the corresponding pickup relays 14*b*, 14*c*, 14*d*, 14*e*, 14*f* and 14*g*.

Upon noting the flashing lamp signal, the attendant at station H answers the indicated call by actuating pickup key 13*h*. Relay 14*h* thereupon operates in an obvious circuit. At its No. 1 armature, relay 14*h* completes an obvious operating circuit to relay 16*h* which relay operates and closes the local speech transmission circuit to the attendant's telephone 10*h*. At its Nos. 2, 3, 4 and 5 armatures and front contacts, relay 14*h* extends the four-wire station transmission circuit to network resistors 90, 91, 92 and 93 by way of leads represented by the broken line conductor 120 from whence the speech circuit is connected to the amplifier AM by way of the input and output channels IP and OP, respectively. Thus the calling station A and the called station H are interconnected for communication purposes and the attendants thereat may converse.

At its Nos. 6 and 7 armature, relay 14*h* connects the dialing contacts 27*h* of dial D*h* in parallel with the dialing contacts 27*a* of dial D*a* at station A so that relay 40 in the selector circuit is now held operated under the separate controls of these contacts. At its Nos. 12 and 13 armatures, relay 14*h* performs no useful function at this time. At armature No. 10 the locking circuit to LS relay 66 is opened so that this relay restores its armatures. At armature No. 9 of relay 14*h* a substitute circuit for lamp signal 24*h* replaces the circuit which originally included the armature No. 8, and with the circuit to interrupter 83 now open at the No. 2 armature of LS relay 66 the lamp 24*h* is lighted steadily by negative battery over conductor 77. With the release of LS relay 66 and the consequent opening of the interrupter circuit to relay 76, the signal lamp 24*a* at the calling station also ceases to flash and is lighted steadily. Thus, incident to the answering of the call signal at station H, the lamp signals at stations H and A are lighted steadily as are the lamps at all other stations. The change in the character of the signal at station A at this time indicates to the attendant thereat that the attendant at the called station has answered the call.

The speech circuits between the calling and called stations may be traced as follows: from transmitter T at station A, over the corresponding plug and jack terminals, transformer 17*a* by way of the armature and front contact of relay 16*a*, Nos. 4 and 5 armatures and front contacts of relay 14*a*, the corresponding two conductors represented by the broken line conductor 160, network resistors 86 and 87, the amplifier input channel IP, through the amplifier AM, the output amplifier output channel OP, network resistors 92 and 93, the corresponding two conductors represented by broken line conductor 120, the Nos. 2 and 3 armatures and front contacts of relay 14*h* to the receiver R at station H by way of the corresponding plug and jack terminals and contacts 38*h* of dial D*h*. The speech path in the opposite direction is similarly traced between the transmitter T at station H and the receiver R at station A and includes the network resistors 90 and 91 and 88 and 89. The impedance matching network between stations is designed to provide essentially independent connection of the stations to the amplifier input circuit and to prevent the telephone receiver circuits from being overloaded. The amplifier circuits IP and OP provide the proper terminating impedance for the input and output of the amplifier. The amplifier provides the circuit gain which is required for large group conference calls and provides the voice signal path between transmitter and receiver circuits.

When the attendants restore their respective pickup keys 13*a* and 13*h*, the station transmission path is interrupted; relays 16*a* and 16*h* are released; and relays 40 and 47 in the selector circuit and relay 95 are released. Release of relays 47 and 95 extinguishes the lamp signals at all of the stations and releases relay 55. The circuit is now in its normal idle condition.

*Dialing a station-to-station call from a subordinate station*

It will be observed that the pickup relay associated with each subordinate station is furnished with a No. 13 armature which is not provided with the pickup relays associated with principal stations. The functions performed by all other armatures of the pickup relays of subordinate stations correspond identically to those of similarly numbered armatures of relay 14*h* or relay 14*a* which have been described in detail hereinbefore. In the following description of a call originating at subordinate station H and intended for principal station C, detailed circuit tracings will be held to a minimum where it is believed that such circuits are fully covered in the preceding description.

It will be observed further that the LS relays corresponding to principal stations have negative battery connected directly to the left terminal of their respective windings, whereas the battery supply to the LS relays associated with subordinate stations is fed to the corresponding winding terminal by way of the armature and back contact of relay 67 and conductors 68 and 69, so that, in the latter case, the battery supply to the LS relays is under control of relay 67 which, in turn, is controlled by the No. 13 armature of the subordinate station pickup relays.

When the attendant at a subordinate station, such as station H, desires to communicate with the attendant at a principal station, such as station C, the pickup key 13*h* at the calling station is actuated causing pickup relay 14*h* to operate. Armatures Nos. 1, 2, 3, 4, 5, 6, 7, 8, 9 and 10 perform the same functions as they did in the previous description. Suffice it to say armature No. 1 operates relay 16*h* which closes the local speech circuit; armatures 2, 3, 4 and 5 extend the local four-wire speech circuit to the balancing networks and amplifier AM of Fig. 2; armatures 6 and 7 connect the dialing contacts 27*h* of dial D*h* to the windings of relay 40 in the selector circuit; armatures Nos. 8 and 9 control the circuit to lamp signal 24*h* so that this lamp is lighted steadily under control of relay 76; and armature No. 10 opens the operating circuit to LS relay 66 to prevent the operation of this relay at this time. Armature No. 12 performs no useful function at this time.

At armature No. 13, relay 14*h* causes relay 67 to operate in a circuit which includes negative battery, the winding of relay 67, upper armatures and back contacts of relays 100 and 101, conductor 102, armature No. 13 and front contact of relay 14*h* and ground. Relay 67, operated, removes battery from conductor 68 and therefore, from the left winding terminal of all unoperated LS relays associated with subordinate stations. It is apparent now that no subordinate station can be signaled as the result of the initiation of a station-to-station call at a subordinate station.

With the closure of the contacts of armatures Nos. 6 and 7 of relay 14*h*, relay 40 and therefore, relay 47 operate as does also relay 95. As the result of the operation of relay 95 the lamp signals at all other stations of the system are lighted steadily on battery at the armature and front contact of relay 95.

When the attendant at station H operates the dial D*h* in accordance with the code digit 5 of the called station C the relays of the selector circuit function as in the earlier description, and rotary magnet 50 drives the selector S to position No. 5. The LS relay 107 associated with station C now operates in a circuit which includes negative battery, the winding of relay 107, No. 10 armature and back contact to relay 14*c*, conductor 112, No. 5 terminal of switch S, brush B1, conductor 54, No. 2 armature and back contact of relay 55, conductor 56, front contact and outer upper armature of relay 49, back contact and inner upper armature of relay 48 and ground. Relay 107, operated, locks to ground at the innermost upper armature and front contact of relay 47, by way of its No. 1 armature and front contact, the No. 10 armature and back contact of relay 14*c*. At its No. 2 armature, relay 107 connects interrupter 83 in series with the winding of relay 76 whereupon the lamp signals 24*h* at the calling station and lamp signal 24*c* at the called station change from steady to flashing signals in a manner now apparent.

At its No. 6 armature and front contact, relay 107 connects audible signal 72*c* to the front contact and armature of relay 75 by way of conductors 113, 114 and 74 so that the audible signal operates under control of relay 75, which, in turn, is held operated just so long as relay 49 remains operated on discharge current from condenser 37. When relay 49 is deenergized at the end of the predetermined time interval, relay 75 releases and opens the circuit to the signal device 72*c*.

In response to the flashing lamp signal 24*c* the attendant at station C actuates key 13*c* thereby completing an obvious operating circuit for relay 14*c*. Relay 16*c* thereupon operates and renders the speech transmitting path at station C continuous. The other functions performed by relay 14*c*, including the opening of the locking circuit to relay 107, are now apparent and need not be repeated. Suffice it to say that stations H and C are now interconnected for communication purposes. With relay 14*c* operated and LS relay 107 released the flashing of lamps 24*h* and 24*c* ceases and these lamps now are lighted steadily.

When relay 49 released, as indicated above, the selector S is returned to normal condition in the manner described hereinbefore.

At the termination of conversation between the attendants at stations H and C the keys 13*h* and 13*c* are released thus restoring the system to normal as previously described.

*Preset limited access conference plan—Dialing from subordinate station*

In accordance with the preset limited access conference plan of this invention, certain designated stations may selectively originate a conference call to any one of a number of groups of stations in which case the stations of the selected group are signaled simultaneously as the result of a single dialing operation at the calling station. In the exemplary embodiment illustrated, relays 101 and 100 are each shown serving a different group of stations, the lower armatures of relay 101 being designated by the small numerals 29, 20, 27 and 4 which correspond, respectively, to the calling codes of stations G, H, E and B. It will be described in detail presently how the operation of such relays, relay 101, for example, is selectively effected upon the dialing of the code 9 at certain designated stations. Those stations of the exemplary disclosure which are provided with facilities for initiating limited access conference calls are the stations H, F, C, B and A whose pickup relays are provided with a No. 12 armature, the front contact of which is connected to conductor 122, which, as is apparent, is common to relays 101 and 100. It will be noted that relay 100, which controls the selection of a different group of stations than the group controlled by relay 101, will be operated when the selector S is stepped to its No. 10 position in response to the dialing of 0 at a calling station.

It will now be assumed that the attendant at the designated subordinate station H desires to establish a conference circuit involving those stations controlled by relay 101, the calling code for which is 9. The pickup key 13*h* at station H accordingly is actuated, and the dial D*h* operated in accordance with the code 9. The immediate results of the actuation of key 13*h* and the consequent operation of pickup relay 14*h* are now apparent and need not be particularized again. Suffice it to say that the lamp signals at all stations are now lighted steadily to indicate to the attendants at all stations that the system is in use.

When the dial D*h* is operated, the selector circuit functions to step selector switch S to its No. 9 position whereupon relay 101 operates in a circuit which includes negative battery, the front contact and No. 12 armature of relay 14*h*, conductor 122, winding of relay 101, conductor 125, No. 9 terminal of switch S and the associated brush B1, conductor 54, No. 2 armature and back contact of relay 55, conductor 56, front contact and outer upper armature of relay 49, back contact and inner upper armature of relay 48.

At its upper armature and back contact, relay 101 opens the energizing circuit to relay 67 causing it to release. It will be observed that the disabling of relay 67 is required in order to enable subordinate stations to be included in limited access groups that are accessible to other designated subordinate stations, otherwise the LS relays at such subordinate stations would be deprived of operating battery because of the operation of the No. 13 armature at a calling subordinate station. In this manner it becomes impossible for a subordinate station to signal another subordinate station on a station-to-station basis while the same subordinate station may signal such other subordinate station when such other subordinate station is included in a limited access group.

At its lower armatures 29, 20, 27 and 4, relay 101 completes operating circuits to LS relays 103, 105 and 108, the circuit to relay 66 now being open at the No. 10 armature of relay 14*h*. The circuits to LS relays 103 and 105 at subordinate stations G and E include negative battery at the armature and back contact of relay 67, whereas the circuit to LS relay 108 at station B includes the negative battery connected directly to its left winding terminal, otherwise the operating circuits ot these relays are apparent from preceding descriptions. The LS relays 103, 105 and 108 locked operated under control of relay 47 and the No. 10 armatures of the corresponding pickup relays.

Each of the operated LS relays at its No. 2 armature and front contact connects interrupter 83 to conductor 82 to cause the intermittent operation of relay 76. At each of the called stations G, E and B the signal lamp flashes under control of relay 76, the circuit for such lamps including the No. 8 armature and back contact of the corresponding pickup relay, the front contact and No. 5 armature of the corresponding LS relay, conductors 84 and 77 and the back contact and armature of relay 76. The lamp 24*h* at calling station H also flashes under control of relay 76 in a circuit which includes the No. 9 armature and front contact of relay 14*h*. Thus all the signal lamps involved in the conference connection are now lighted intermittently.

When the attendant at each of the stations at which the lamp signal is flashing answers the call by actuating the pickup key at his station, the corresponding pickup relay is operated to perform functions which are now apparent. As each pickup relay is operated, the locking circuit for the corresponding LS relay is opened causing this relay to release. It will be noted that the circuit to relay 76 will be maintained until the last LS relay releases so that the lamps at the calling and called stations will continue to flash until all stations have answered the call. When all LS relays have released, relay 76 releases and the corresponding lamp signals light steadily on negative battery supplied over conductor 77 and the armature and back contact of relay 76. It will be understood also that the audible signal at each called station which was operated in a manner now apparent, is silenced when the corresponding LS relay releases if relay 49 in the selector circuit has not yet released.

The operated pickup relays extend the local four-wire speech transmission circuits of each station to the matching networks and amplifier AM in a manner now apparent. The four stations H, G, E and B are now connected for communication purposes and the attendants thereat may converse on a conference basis.

Upon termination of the conference call the attendants restore their respective pickup keys to restore the system to normal in a manner now apparent.

In the event one or more of the called stations should fail to answer the conference call, the corresponding one or more LS relays would remain operated and locked under control of relay 47 in the selector circuit. They would release when relay 47 releases when the last station of those answering the call disconnects and causes the release of relay 40 and the consequent release of relay 47. Under this condition, until the release of relay 47, the lamp signals at all of the stations involved in this call would continue to flash.

It is not deemed necessary to describe in detail the initiation of a limited access conference call from a principal station since the overall operations just described in connection with the origination of such a call from a subordinate station are the same with the exception that when a principal station originates a limited access conference call, relay 67 never operates.

It is apparent that, as disclosed in the illustrated embodiment, two groups of stations are provided for insofar as limited access conference calls are concerned, one controlled by relay 101 and terminal No. 9 of switch S and the other by relay 100 and terminal 0 of switch S. It will be noted that the flexibility of the disclosed system is such that one or more stations may, if expediency justifies it, be included in both groups. For example, if the No. 29 front contact of relay 101 is multiplied with one of the lower front contacts of relay 100, then when relay 100 is operated in the establishing of a conference call, station G would be included in the station group controlled by relay 100 as well as in the group controlled by relay 101.

*Preset unlimited access conference plan—Dialing from principal station*

The principal station C in the drawings is selected to illustrate this feature of the invention. The operation of relay 14*c* at principal station C, incident to the operation of key 13*c* thereat, performs the same functions as did relay 14*a* set forth in an earlier description.

Assuming the attendant at station C wishes to set up an unlimited conference call, the key 13*c* is actuated and the dial D*c* operated in accordance with the code 8. Prior to the actuation of the dial, the equipment functions in exactly the same manner as in previous calls. Suffice it to say that the lamp signals at all stations of the system are lighted steadily to indicate to all attendants that the system has been put in use.

When the dial D*c* is operated in accordance with the conference code, the switch S is stepped around to its No. 8 position in well known manner, whereupon the circuit from negative battery through the winding of relay 141 is extended from switch terminal No. 8 over brush B1, conductor 54, No. 2 armature and back contact of relay 55, conductor 56, front contact and outer upper armature of relay 49, back contact and inner upper armature of relay 48 to ground. Relay 141 operates in this circuit and at its armature and front contact completes an operating circuit for relay 142 by way of conductor 143 and the path just traced to ground at the inner upper armature of relay 48. Relay 142, operated, locks by way of its inner upper armature and front contact and at its outer upper armature opens the operating circuit for relay 141 which relay releases.

At its lower armatures, relay 142 completes five operating circuits to LS relays 103, 104, 106, 66 and 109. The circuit to LS relay 107 is, at this time, open at the No. 10 armature and back contact of relay 14*c* at the calling station C. Relay 103 operates in a circuit including negative battery, armature and back contact of relay 67, conductors 68 and 69, winding of relay 103, No. 10 armature and back contact of pickup relay 14*g*, conductors 126 and 148, front contact and No. 29 armature of relay 142 and ground. Relay 104 operates in a circuit which includes negative battery, armature and back contact of relay 67, conductors 68 and 69, winding of relay 104, No. 10 armature and back contact of relay 14*f*, conductors 165 and 147, front contact and No. 28 armature of relay 142 and ground. Relay 106 operates in a circuit which includes negative battery, armature and back contact of relay 67, conductors 68 and 69, winding of relay 106, No. 10 armature and back contact of relay 14*d*, conductor 146, front contact and No. 26 armature of relay 142 and ground. Relay 66 operates in a circuit including negative battery, armature and back contact of relay 67, conductors 68 and 69, winding of relay 66, No. 10 armature and back contact of relay 14*h*, conductors 70, 71 and 145, front contact and No. 20 armature of relay 142 and ground. Relay 109 operates in a circuit including negative battery, winding of relay 109, No. 10 armature and back contact of relay 14*a*, conductor 144, front contact and No. 3 armature of relay 142 and ground. The LS relays thus operated, lock to ground at the innermost upper armature and front contact of relay 47 by way of their respective front contacts and No. 1 armatures and conductor 79.

As in the case of the limited access conference call, relay 76 operates under control of each of the operated LS relays to cause the station lamps to flash as a call signal. The audible signals at the called stations operate under control of relay 75 and LS relays at the called station and hold operated until the release of the corresponding LS relays or until the release of relay 75 which follows the release of relay 49 in the selector circuit. Incident to the operation of their respective pickup keys in answer to the flashing signal, the involved stations are interconnected for speech transmission and reception by way of their corresponding matching networks, amplifier AM and the four-wire circuits whose continuity at stations G, F, D, H, C and A is established by the Nos. 2, 3, 4 and 5 armatures of the corresponding pickup relays. It will be noted that the lamp signals at all stations involved in the described call, both calling and called stations, will continue to flash until all stations have answered, at which time all lamps at the calling and called stations revert to the steady busy condition. This condition prevails with the wiring of the lamp circuit illustrated at the various stations of Figs. 3 and 4.

It will be observed with reference to the wiring of the lamp circuit at station E, Fig. 4, that an option X is provided which may be employed at any or all of the stations in place of the wiring option Y. When Y wiring is used at the pickup relays, the signal lamp flashes at the called station or stations only and as each called station answers, its corresponding lamp signal reverts to the steady busy condition. The lamp at the calling station remains steadily lighted throughout the call and does not flash at any time. It is not necessary that all stations assume the same optional wiring. If certain stations are provided with Y wiring while other stations are wired in accordance with the X option, the lamps at the stations with Y wiring would continue to flash until all called stations have answered, at which time such lamps would revert to the steady busy condition or until the call was abandoned, while the lamps at called stations with X wiring would flash until these stations answered, whereupon the lamp signal at each station reverts to the steady busy condition due to the release of the corresponding LS relay. If the calling station is provided with X wiring, the lamp signal would remain steadily lighted for the duration of the call.

At the termination of the conference call, all pickup keys are returned to normal positions whereupon the system is restored to normal idle condition. It is understood that the selector switch S is restored to normal upon release of relay 49 as set forth in earlier descriptions.

While the illustrated embodiment of the invention provides but one unlimited access conference plan it is understood that more than one such plan may be accommodated. Also the circuitry of the unlimited access conference plan may be used, if desired, to provide main and extension station service.

What is claimed is:

1. In an intercommunicating telephone system, a calling station, a called station, a signal at each station, a selector circuit, a dial at said calling station having dialing contacts normally open with respect to said selector circuit, a switch at said calling station, means responsive to the operation of the switch at said calling station for operating the signal at each of said stations in a distinctive manner and for closing the dialing contacts of said dial to said selector circuit, means including said selector circuit responsive to the operation of said dial for operating the signals at each of said stations in a different distinctive manner, and means controlled at said called station for reoperating the signal at each of said stations in the said first distinctive manner.

2. In an intercommunicating telephone system, a plurality of stations, including a called and a calling station, a signal at each of said stations, a key at each station, a dial at each station, means responsive to the operation of the key at a calling station for operating the signals at all of said stations in a distinctive manner, means responsive to the operation of the dial at the calling station in accordance with a particular code for altering the character of the signal at the calling and called stations, and means responsive to the operation of the key at the called station for again altering the character of the signal at the calling and called stations.

3. In an intercommunicating telephone system, stations including subordinate and principal stations, a signal at each of said stations, a signal control means for each signal, means responsive to the initiation of a call at a first calling subordinate station and intended for a second subordinate station for disabling the signal control means associated with the signal at the said second subordinate station, means for grouping said stations so as to include said second subordinate station with other of said stations for a conference call, and means responsive to the initiation of a conference call at the said first calling subordinate station for operating said grouping means and enabling the signal control means associated with the signal at the said second subordinate station whereby said second subordinate station may be signaled from said first calling subordinate station only upon the initiation of a conference call involving a group of stations including the said second subordinate station.

4. In a multistation intercommunicating telephone system involving principal and subordinate stations and in which station-to-station calls and conference calls involving a group of stations may be initiated at a calling station, means for rendering subordinate stations accessible only to principal stations on station-to-station calls and to certain subordinate stations on conference calls, and switching means controlled from a subordinate station for completing a conference call.

5. In a multistation intercommunicating telephone system involving principal and subordinate stations and in which station-to-station calls and conference calls involving groups of stations may be initiated at a calling station and completed by the dialing thereat of station and conference codes, respectively, principal stations, subordinate stations, a signal device at each station, a dial at each station, a signal control relay for each station, means responsive to the initiation of a call at a subordinate station for disabling the signal control relays of all other subordinate stations, and means responsive to the initiation of a call at the same subordinate station followed thereat by the dialing of a conference code, for operating the signal control relay of each of a group of stations including subordinate stations.

6. In a multistation intercommunicating telephone system involving principal and subordinate stations and in which station-to-station calls and conference calls involving groups of stations may be originated at a calling station and completed by the dialing of a station code for a particular station-to-station call and by the dialing of a conference code for a conference call, principal stations, subordinate stations, a signal device at each station, a signal control relay for each station, a dial at each station, a call-originating key at each station, means responsive to the operation of the call-originating key at a calling subordinate station for disabling the signal control relays of all other subordinate stations whereby only the signal control relays of principal stations are available for response to the dialing of a station-to-station code at the calling subordinate station, and means responsive to the dialing of a conference code at the calling subordinate station following the operation of the call-originating key thereat for enabling the signal control relays of certain of the subordinate stations.

7. In a multistation intercommunicating telephone system involving principal and subordinate stations and in which station-to-station calls and conference calls involving groups of stations may be initiated and then completed by the dialing of station codes and conference codes, respectively, principal stations, subordinate stations, a call-originating key at each station, a dial at each station, a signal device at each station, means responsive to the operation of a call-originating key at any station for operating the signal device at all other stations in a particular manner, means at each station for altering the character of the signal manifested by said signaling device, means responsive to the operation of a call-originating key at a calling subordinate station for disabling the signal character altering means at all other subordinate stations, and means responsive only to the dialing of a conference code at the calling subordinate station for enabling the disabled signal character altering means at certain other subordinate stations.

References Cited in the file of this patent

UNITED STATES PATENTS

| | | |
|---|---|---|
| 1,492,995 | Lubberger | May 6, 1924 |
| 1,665,466 | Middleton | Apr. 10, 1928 |